United States Patent
Shen et al.

(10) Patent No.: US 10,878,284 B2
(45) Date of Patent: Dec. 29, 2020

(54) METHOD AND APPARATUS FOR TRAINING IMAGE MODEL, AND METHOD AND APPARATUS FOR CATEGORY PREDICTION

(71) Applicant: FUJITSU LIMITED, Kanagawa (JP)

(72) Inventors: Wei Shen, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 104 days.

(21) Appl. No.: 16/299,177

(22) Filed: Mar. 12, 2019

(65) Prior Publication Data
US 2019/0286940 A1 Sep. 19, 2019

(30) Foreign Application Priority Data
Mar. 13, 2018 (CN) .......................... 2018 1 0205269

(51) Int. Cl.
| | | |
|---|---|---|
| G06K 9/00 | (2006.01) | |
| G06K 9/62 | (2006.01) | |
| G06T 11/60 | (2006.01) | |
| G06N 3/08 | (2006.01) | |

(52) U.S. Cl.
CPC .......... *G06K 9/6256* (2013.01); *G06K 9/626* (2013.01); *G06N 3/08* (2013.01); *G06T 11/60* (2013.01); *G06T 2210/12* (2013.01); *G06T 2210/22* (2013.01)

(58) Field of Classification Search
None
See application file for complete search history.

(56) References Cited

U.S. PATENT DOCUMENTS

| | | | |
|---|---|---|---|
| 2011/0135166 A1* | 6/2011 | Wechsler | G06K 9/627 382/118 |
| 2016/0035078 A1* | 2/2016 | Lin | G06K 9/66 382/157 |
| 2016/0174902 A1* | 6/2016 | Georgescu | A61B 5/7267 600/408 |
| 2019/0114804 A1* | 4/2019 | Sundaresan | G06K 9/66 |
| 2019/0147221 A1* | 5/2019 | Grabner | G06T 7/75 382/103 |
| 2019/0147288 A1* | 5/2019 | Gupta | G06K 9/6202 715/253 |
| 2019/0236411 A1* | 8/2019 | Zhu | G06K 9/6292 |
| 2019/0370965 A1* | 12/2019 | Lay | G06N 20/00 |

\* cited by examiner

*Primary Examiner* — Shervin K Nakhjavan
(74) *Attorney, Agent, or Firm* — Xsensus LLP

(57) ABSTRACT

The method for training an image model, in each round of training performed with respect to each sample image: inputs an image obtained by cropping the sample image by an object extraction component obtained through a previous round of training, as a scale-adjusted sample image, into the image model, wherein the object extraction component is used for extracting concerned objects in sample images at respective scales; inputs a feature of the scale-adjusted sample image into a local classifier in the image model respectively, performs category prediction with respect to feature points in the feature, so as to obtain a local prediction result, and updates the object extraction component based on the local prediction result; performs object level category prediction for the scale-adjusted sample image based on the feature and the updated object extraction component; and trains the image model based on a category prediction result of the scale-adjusted sample image.

10 Claims, 8 Drawing Sheets

METHOD AND APPARATUS FOR TRAINING IMAGE MODEL, AND METHOD AND APPARATUS FOR CATEGORY PREDICTION

FIELD OF THE INVENTION

The present disclosure relates to the field of information processing, and particularly to a method and apparatus for training an image model which are capable of obtaining a trained image model for quickly and accurately classifying images at different scales, and a method and apparatus for category prediction which are capable of quickly and accurately classifying images at different scales.

BACKGROUND OF THE INVENTION

Object classification is difficult if scales of objects change dynamically. For a given image, an object may occupy the entire image or a small part of the image. This poses great challenges for current object classification models, such as convolutional neural network (CNN) models, which are sensitive to object scales. Models trained using objects at a single scale will be good at classifying the objects at that scale while the performance of the model will decrease if the testing objects are at different scales. To deal with objects at different scales, researchers train models using objects at different scales. However, this requires that a bounding box of the objects is known so that the objects could be cropped and zoomed at different scales. Manual annotation of bounding boxes is both time-consuming and labor-consuming.

Moreover, the accuracy of models obtained through training in the above manner in the prior art is generally not high, thus causing the classification for the objects not accurate enough.

SUMMARY OF THE INVENTION

A brief summary of the present disclosure is given below to provide a basic understanding of some aspects of the present disclosure. However, it should be understood that the summary is not an exhaustive summary of the present disclosure. It does not intend to define a key or important part of the present disclosure, nor does it intend to limit the scope of the present disclosure. The object of the summary is only to briefly present some concepts about the present disclosure, which serves as a preamble of the more detailed description that follows.

In view of the above problem, an object of the present disclosure is to provide a method and apparatus for training an image model, and a method and apparatus for category prediction, which are capable of solving one or more defects in the prior art.

According to an aspect of the present disclosure, there is provided a method for training an image model which may comprise: performing N rounds of iterative training for the image model with respect to each sample image in a training set, where N is an integer greater than or equal to 2, and obtaining, based on training results with respect to all sample images in the training set, an image model for which training has been completed, wherein the following processing is performed in each round of training performed with respect to each sample image: inputting an image obtained by cropping the sample image by an object extraction component obtained through a previous round of training, as a scale-adjusted sample image, into the image model, wherein the object extraction component can be used for extracting concerned objects in sample images at respective scales, and a sample image at an initial scale is the sample image which is original; inputting a feature of the scale-adjusted sample image into a predetermined number of local classifiers in the image model respectively, performing category prediction with respect to feature points in the feature, so as to obtain a local prediction result, and updating the object extraction component based on the local prediction result; performing object level category prediction for the scale-adjusted sample image based on the feature and the updated object extraction component; and training the image model based on a category prediction result of the scale-adjusted sample image.

According to another aspect of the present disclosure, there is provided an apparatus for training an image model, comprising: an iterative training unit which may be configured to perform N rounds of iterative training for the image model with respect to each sample image in a training set, where N is an integer greater than or equal to 2, and an image model obtaining unit configured to obtain, based on training results with respect to all sample images in the training set, an image model for which training has been completed, wherein processing in the following sub-units is performed respectively, in each round of training performed with respect to each sample image: an input sub-unit configured to input an image obtained by cropping the sample image by an object extraction component obtained through a previous round of training, as a scale-adjusted sample image, into the image model, wherein the object extraction component can be used for extracting concerned objects in sample images at respective scales, and a sample image at an initial scale is the sample image which is original; an object extraction component updating sub-unit which may be configured to input a feature of the scale-adjusted sample image into a predetermined number of local classifiers in the image model respectively, performing category prediction with respect to feature points in the feature, so as to obtain a local prediction result, and to update the object extraction component based on the local prediction result; an object level category prediction sub-unit configured to perform object level category prediction for the scale-adjusted sample image based on the feature and the updated object extraction component; and a training sub-unit configured to train the image model based on a category prediction result of the scale-adjusted sample image.

According to yet another aspect of the present disclosure, there is provided a method for performing category prediction for an image to be classified using an image model obtained through training by the above method for training an image model, in which, with respect to the image to be classified, N rounds of category prediction may be performed using the trained image model, wherein in each round of category prediction, a scale of the image to be classified may be adjusted according to a result of a previous round of category prediction, and the scale-adjusted image to be classified may be used as an input image of the trained image model to perform this round of category prediction, where N is an integer greater than or equal to 2.

According to other aspects of the present disclosure, there is further provided a computer program code and a computer program product for implementing the above method according to the present disclosure, as well as a computer readable storage medium having recorded thereon the computer program code for implementing the above method according to the present disclosure.

Other aspects of embodiments of the present disclosure will be given in the following specification part, wherein preferred embodiments for sufficiently disclosing embodiments of the present disclosure are described in detail, without applying limitations thereto.

BRIEF DESCRIPTION OF THE DRAWINGS

The present disclosure can be better understood with reference to the detailed description given in conjunction with the appended drawings below, wherein throughout the drawings, same or similar reference signs are used to represent same or similar components. The appended drawings, together with the detailed descriptions below, are incorporated in the specification and form a part of the specification, to further describe preferred embodiments of the present disclosure and explain the principles and advantages of the present disclosure by way of examples. In the appended drawings.

EMBODIMENTS OF THE INVENTION

Hereinafter, exemplary embodiments of the present disclosure will be described in conjunction with the appended drawings. For the sake of clarity and conciseness, the specification does not describe all features of actual embodiments. However, it should be understood that in developing any such actual embodiment, many decisions specific to the embodiments must be made, so as to achieve specific objects of a developer; for example, those limitation conditions related to the system and services are met, and these limitation conditions possibly would vary as embodiments are different. In addition, it should also be appreciated that although developing tasks are possibly complicated and time-consuming, such developing tasks are only routine tasks for those skilled in the art benefiting from the contents of the present disclosure.

It should also be noted herein that, to avoid the present disclosure from being obscured due to unnecessary details, only those device structures and/or processing steps closely related to the solution according to the present disclosure are shown in the appended drawings, while omitting other details not closely related to the present disclosure.

Embodiments of the present disclosure will be described in detail in conjunction with the drawings below.

Figure 1:
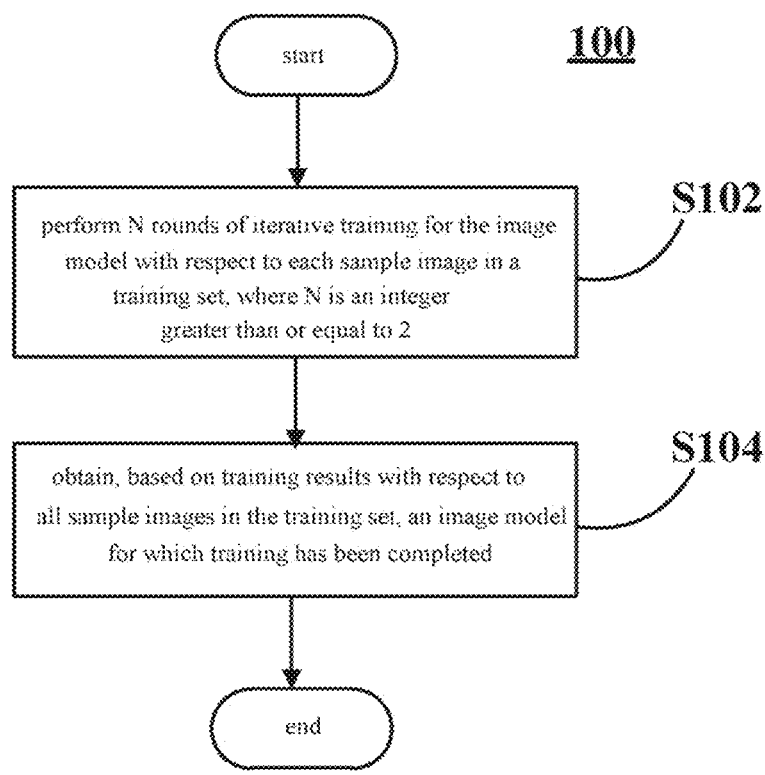
FIG. 1 is a flowchart showing an example of a flow of a method for training an image model according to an embodiment of the present disclosure.

Firstly, an example of a flow of a method 100 for training an image model according to an embodiment of the present disclosure will be described with reference to FIG. 1. FIG. 1 is a flowchart showing an example of a flow of the method 100 for training an image model according to the embodiment of the present disclosure. As shown in FIG. 1, the method 100 for training an image model according to the embodiment of the present disclosure comprises an iterative training step S102 and an image model obtaining step S104.

In the iterative training step S102, N rounds of iterative training may be performed for the image model with respect to each sample image in a training set, where N is an integer greater than or equal to 2.

As an example, for a given training set, two or more rounds of iterative training may be performed for the image model with respect to each sample image in the training set.

Figure 2:
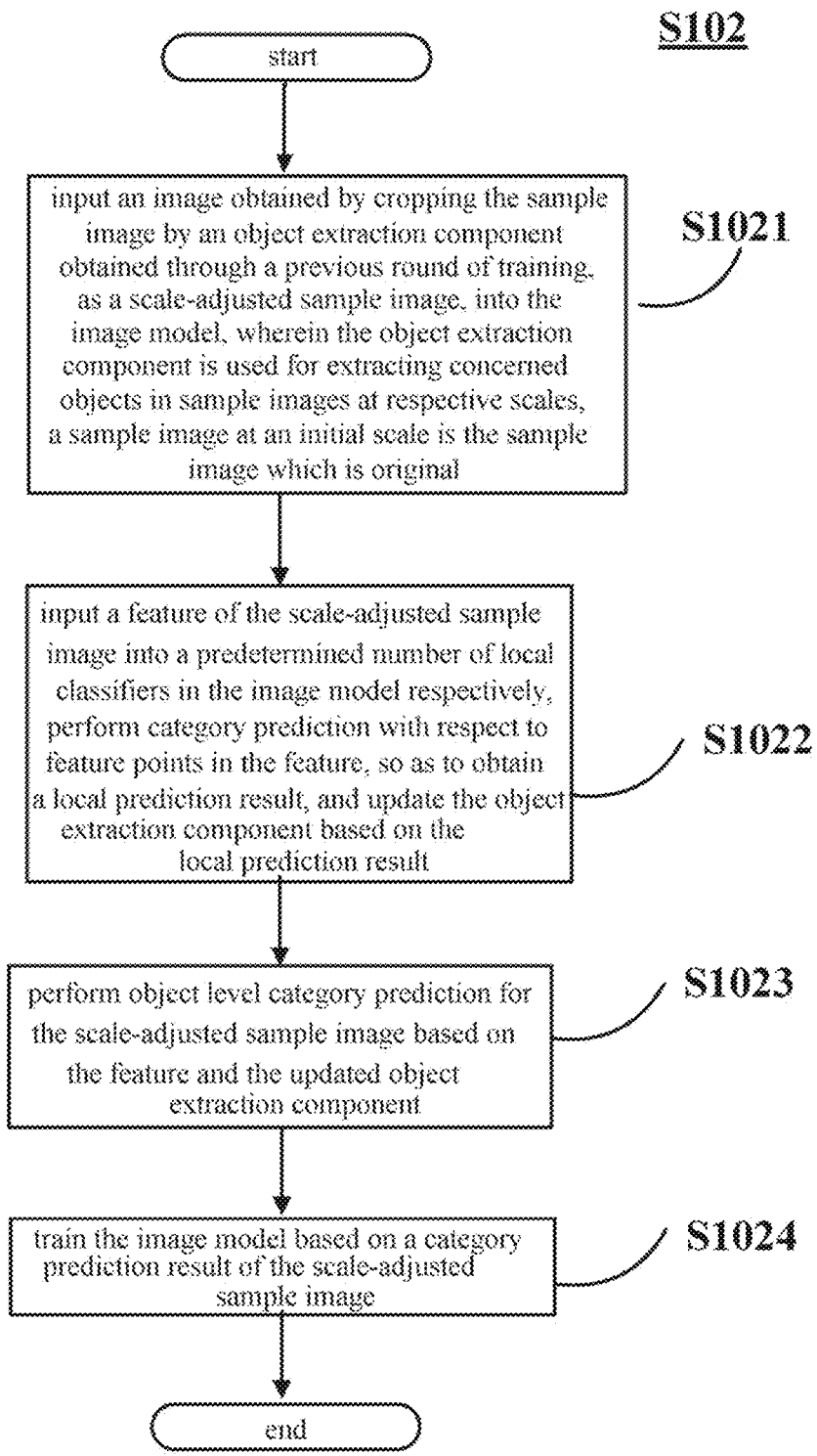
FIG. 2 shows an example of a flow of processing performed in an iterative training step of the method for training an image model according to the embodiment of the present disclosure.

FIG. 2 shows an example of a flow of processing performed in the iterative training step S102 of the method 100 for training an image model according to the embodiment of the present disclosure. As shown in FIG. 2, in the iterative training step S102, in each round of training performed with respect to each sample image, processing in an input sub-step S1021, an object extraction component updating sub-step S1022, an object level category prediction sub-step S1023 and a training sub-step S1024 are respectively performed.

In each round of training performed with respect to each sample image, in the input sub-step S1021, an image obtained by cropping the sample image by an object extraction component obtained through a previous round of training may be input, as a scale-adjusted sample image, into the image model, wherein the object extraction component can be used for extracting concerned objects in sample images at respective scales, and a sample image at an initial scale is the sample image which is original.

As an example, in each round of training performed with respect to each sample image, a scale of the sample image may be adjusted according to a result of a previous round of training, and this round of training on the image model may be performed using the scale-adjusted sample image as an input image of the image model. To be more specific, in each round of training, the sample image may be cropped by an object extraction component obtained through a previous round of training, and an image obtained through the cropping may be input, as a scale-adjusted sample image, into the image model, so as to train the image model. As an example, in each round of training, an image obtained by cropping the sample image by an object extraction component obtained through a previous round of training may be used as an input image of the image model directly, and an image obtained through the cropping may be used as an input image of the image model after a scale of the image obtained through the cropping is adjusted (i.e., the image obtained through the cropping is zoomed), as well.

The object extraction component may be a binary image including a zero-value area and a non-zero-value area, wherein the zero-value area indicates a background area, and the non-zero-value area indicates a concerned area (i.e., foreground area). As an example but not a limitation, the object extraction component can be an attention mask, which can be used for extracting concerned objects (i.e., foreground objects) in sample images at respective scales. The object extraction component can also be a component other than the attention mask, as long as the object extraction component can extract the concerned objects in the sample images at the respective scales.

As an example, it is assumed that N is 3, i.e., three rounds of iterative training are performed on the image model. In a first round of training, an original sample image is inputted into the image model so as to train the image model, and a first object extraction component at a first scale is obtained through operations in the training process. Then, in a second round of training, the original sample image may be cropped by the first object extraction component obtained through the first round of training, an image including a concerned object at a first scale which is obtained through the cropping may be inputted into the image model so as to train the image model, and the object extraction component at the first scale is updated through operations in the training process, so as to obtain a second object extraction component at a second scale. Finally, in a third round of training, the original sample image may be cropped by the second object extraction component obtained through the second round of training, and an image including the concerned object at a second scale which is obtained through the cropping may be inputted into the image model so as to train the image model.

Figure 3:
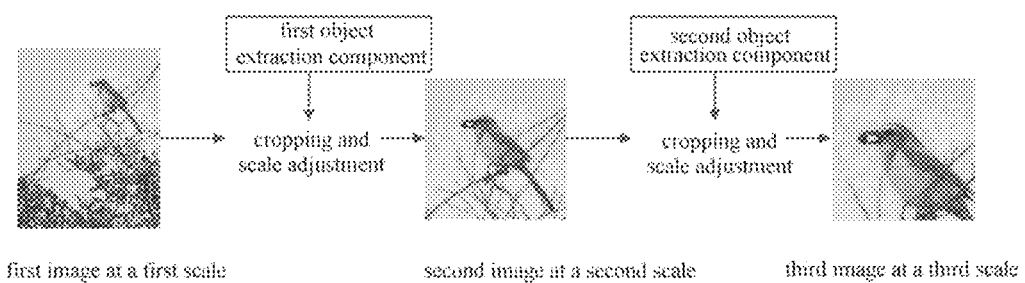
FIG. 3 shows examples of input images at different scales in each round of training, when three rounds of iterative training are performed on the image model, according to the embodiment of the present disclosure.

FIG. 3 shows examples of input images at different scales in each round of training, when three rounds of iterative training are performed on the image model, according to the embodiment of the present disclosure. As shown in FIG. 3, in a first round of training, an input image inputted into the image model is a first image at a first scale which is used as the original sample image; in a second round of training, an input image is a second image at a second scale which is obtained by cropping the original sample image by a first object extraction component obtained through the first round of training and performing scale adjustment for the cropped image; and in a third round of training, an input image is a third image at a third scale which is obtained by cropping the original sample image by a second object extraction component obtained through the second round of training and performing scale adjustment for the cropped image.

Preferably, in each round of training performed with respect to each sample image, in the input sub-step S1021, cropping the sample image by the object extraction component may comprise: enlarging the object extraction component to the scale of the initial sample image; calculating a bounding box of a non-zero area in the enlarged object extraction component; and cropping the sample image using the bounding box, and using the cropped image as the scale-adjusted sample image.

As an example, as stated above, in a first round of training, an input image inputted into the image model is the initial sample image, and in this round of training, a first image at a first scale is obtained through operations. In each subsequent round of training, an object extraction component obtained through a previous round of training is enlarged to the scale of the initial sample image; then, a bounding box of a non-zero area (i.e., white area) in the enlarged object extraction component may be calculated using the prior art, the sample image is cropped using the bounding box, and the cropped image is used as the scale-adjusted sample image.

Figure 4:
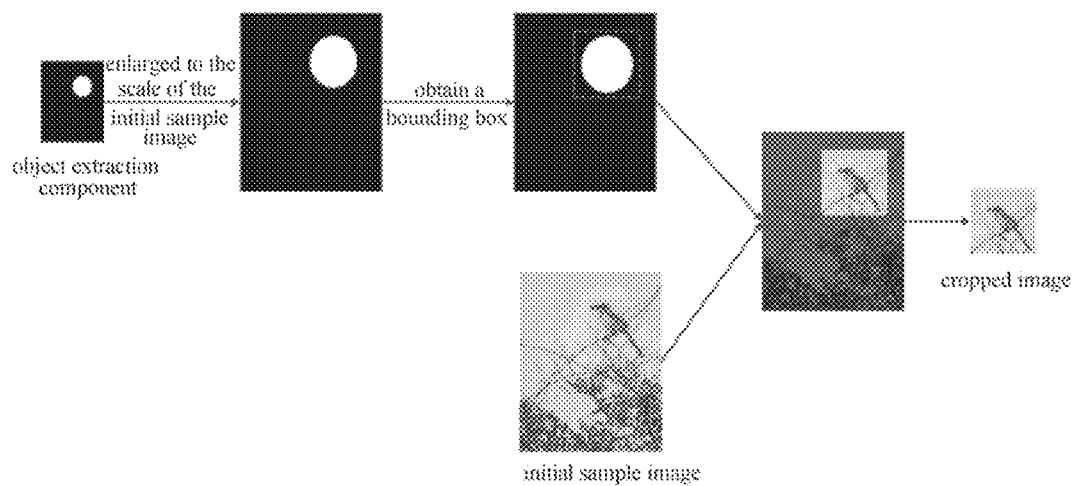
FIG. 4 is a diagram showing an example of cropping a sample image using an object extraction component according to the embodiment of the present disclosure.

FIG. 4 is a diagram showing an example of cropping a sample image using an object extraction component according to the embodiment of the present disclosure.

FIG. 4, at the leftmost side, shows an object extraction component, wherein a white circular area (non-zero area) in the object extraction component indicates a location proportion relationship of a concerned object in an image in that image. The object extraction component is enlarged to the scale of the initial sample image, to obtain an enlarged object extraction component as shown in a second column in FIG. 4. The white dashed box in the image at the upper portion in a third column in FIG. 4 is a bounding box of the non-zero area in the enlarged object extraction component, and the image at the lower portion in the third column in FIG. 4 is the initial sample image. The highlighted rectangular area (area including a bird in the image) in the image in a fourth column in FIG. 4 indicates an area in the initial sample image which is to be cropped using the bounding box. Finally, the cropped image, which is the scale-adjusted sample image, is shown in a fifth column of FIG. 5. The scale-adjusted sample image can be used as an input image of the image model in a next round of training.

As can be seen from the above, the method 100 for training an image model can automatically learn an object extraction component, and automatically generate a bounding box of a concerned object based on the learned object extraction component, thereby an image model capable of quickly performing category prediction on images at different scales can be obtained.

In each round of training performed with respect to each sample image, in the object extraction component updating sub-step S1022, a feature of the scale-adjusted sample image may be inputted into a predetermined number of local classifiers in the image model respectively, category prediction may be performed with respect to feature points in the feature, so as to obtain a local prediction result, and the object extraction component may be updated based on the local prediction result.

As an example, the image model can have a predetermined number of local classifiers. The local classifiers can perform category prediction with respect to feature points in a feature of an image, so as to obtain a local prediction result. By taking a case in which three rounds of iterative training are performed on the image model as stated above as an example and assuming that the number of the local classifiers is n (n is an integer greater than or equal to 1), in a first round of training, a feature of a first image at a first scale is inputted into the n local classifiers, respectively, to obtain a first local prediction result, and an object extraction component at the first scale can be obtained through calculation based on the first local prediction result; in a second round of training, a feature of a second image at a second scale is inputted into the above n local classifiers, respectively, to obtain a second local prediction result, and the object extraction component at the first scale may be updated through calculation based on the second local prediction result, so as to obtain an object extraction component at the second scale; and in a third round of training, a feature of a third image at a third scale is inputted into the above n local classifiers, respectively, to obtain a third local prediction result, and the object extraction component at the second scale may be updated through calculation based on the third local prediction result, so as to obtain an object extraction component at the third scale.

In each round of training, a feature of an input image of the image model may be extracted using the prior art. As an example but not a limitation, a feature of an input image of the image model may be extracted using a Convolutional Neural network (CNN).

Preferably, in each round of training, in the object extraction component updating sub-step S1022, a feature of the scale-adjusted sample image may be obtained using a CNN in the image model.

As an example, the image model comprises a feed-forward CNN. In each round of training, a high level feature map, i.e., a CNN feature (or called CNN feature map), of an input image of the image model is obtained by the CNN in the image model. It is assumed that a size of the CNN feature is C×H×W, where C is the number of channels of the feature map (that is, C is a longitudinal length of the feature map), and H and W are a length and a width of the plane of the feature map, respectively. In the description below, description will be made by taking a case in which a feature of an input image of the image model is extracted by using the CNN as an example.

Preferably, in each round of training performed with respect to each sample image, in the object extraction component updating sub-step S1022, the local prediction result may be obtained by: performing category prediction using each local classifier, respectively, based on feature vectors at different locations which are extracted along a channel direction of the feature, to calculate a prediction result of each local classifier; and taking a maximum value with respect to the prediction results of the predetermined number of local classifiers, respectively, as the local prediction result.

As an example, in each round of training, with respect to one location (one point on the plane formed by the length and the width) on the CNN feature, a longitudinal feature vector is extracted along a channel direction of the CNN feature (as stated above, the number of channels of the CNN feature is C), to form one C-dimensional feature vector. The one C-dimensional feature vector is inputted as a feature vector into one local classifier to be classified, thereby a (M+1)-dimensional prediction vector can be obtained, wherein M is the number of categories of classifying, and "+1" indicates adding one background category. A C-dimensional feature vector is extracted in the above manner with respect to each location (each point of H×W points on the plane formed by the length and the width of the CNN feature) on the CNN feature, thereby H×W C-dimensional feature vectors can be obtained. After performing category prediction on all the H×W C-dimensional feature vectors using each local classifier respectively, for each local classifier, a prediction probability of a size of (M+1)×H×W (i.e., a category probability heat map of a size of (M+1)×H×W, wherein a longitudinal direction of the category probability heat map is a direction of a predicted category) can be obtained as a prediction result of each local classifier. With respect to the n prediction results (i.e., n feature vectors of size of (M+1)×H×W) obtained by the n local classifiers, a maximum value of the above n prediction results at each location of the (M+1)×H×W locations is taken at this location, respectively, to obtain a feature vector of a size of (M+1)×H×W, as the local prediction result.

Preferably, in each round of training performed with respect to each sample image, in the object extraction component updating sub-step S1022, updating the object extraction component based on the local prediction result comprises: taking a maximum value with respect to the local prediction result at each location, in a direction of a predicted category of the local prediction result, to obtain a two-dimensional prediction result; and using, as the updated object extraction component, a result obtained after performing binary processing on the two-dimensional prediction result.

As an example, with respect to the above local prediction result of a size of (M+1)×H×W, in a longitudinal direction of the category probability heat map (i.e., in a direction of M predicted categories), a maximum value is taken with respect to the local prediction result at each location of the H×W locations, to obtain a two-dimensional prediction result of a size of H×W; then, binary processing is performed on the two-dimensional prediction result by a binary method, and a result obtained through the binary processing is used as the object extraction component. As an example but not a limitation, the binary method can be Otsu method, but the binary method is not limited thereto.

It should be noted that, in each round of training, as a scale of an input image of the image model changes, the length and the width (i.e., the above H and W) of the CNN feature of the input image which is obtained by the CNN in the image model also change, so that a size of an object extraction component obtained in each round of training is different.

Figure 5:
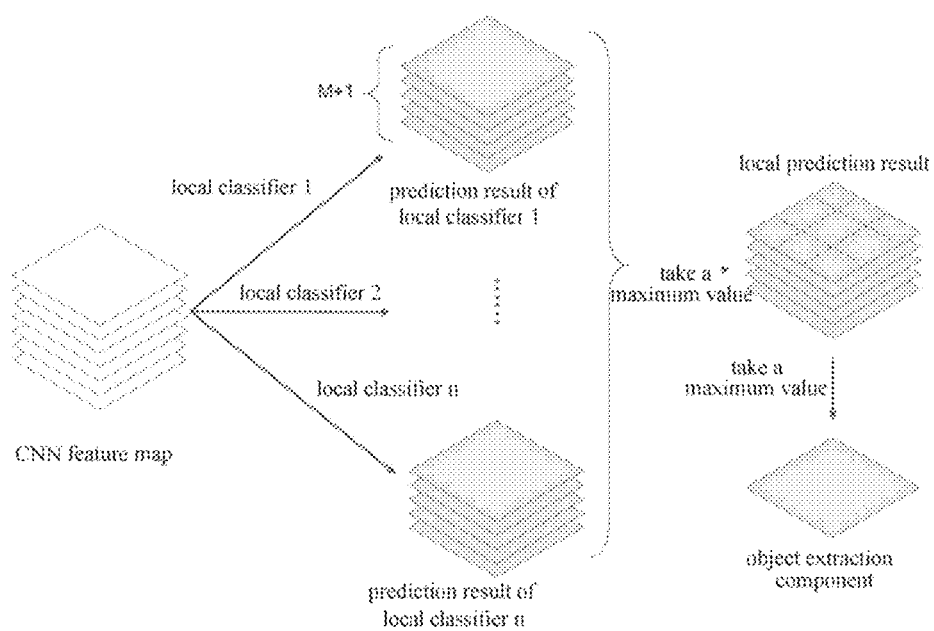
FIG. 5 is a diagram showing an example of obtaining an object extraction component based on a feature of an input image of the image model according to the embodiment of the present disclosure.

FIG. 5 is a diagram showing an example of obtaining an object extraction component based on a feature of an input image of the image model according to the embodiment of the present disclosure.

FIG. 5, at the leftmost side, shows a CNN feature map of an input image of the image model. Although not explicitly annotated in FIG. 5, it is still assumed that the CNN feature map is a vector of C×H×W (as stated above, C is the number of channels, and H and W are a length and a weight of the CNN feature map, respectively), wherein a longitudinal direction of the CNN feature as shown at the leftmost side of FIG. 5 is a channel direction. Then, the CNN feature map is inputted to the n local classifiers (local classifier 1, local classifier 2, . . . , and local classifier n) in the image model, respectively, to obtain a prediction result of a size of (M+1)×H×W of each local classifier as shown in the middle of FIG. 5 (as stated above, in each prediction result, M represents the number of categories of classifying, and "+1" indicates adding one background category). With respect to n prediction results obtained by the n local classifiers, a maximum value of the above n prediction results at each location is taken at the location, respectively, as the local prediction result, as shown by the three-dimensional diagram at the upper portion at the rightmost side in FIG. 5. Finally, with respect to the local prediction result, in the longitudinal direction (i.e., in the direction of M predicted categories), a maximum value is taken with respect to the local prediction result at each location of the H×W locations, to obtain a two-dimensional prediction result of a size of H×W, and a result obtained after performing binary processing on the two-dimensional prediction result is used as the object extraction component, as shown by the two-dimensional diagram at the lower portion at the rightmost side in FIG. 5.

In each round of training performed with respect to each sample image, in the object level category prediction sub-step S1023, object level category prediction may be performed for the scale-adjusted sample image, based on the feature and the updated object extraction component.

As an example, the image model can comprise an object classifier which performs prediction on the basis of an object level feature in an image. In each round of training performed with respect to each sample image, an object level feature of the input image may be extracted based on the CNN feature map of the input image (i.e., the above scale-adjusted sample image) of the image model and the updated object extraction component, so as to perform object level category prediction by the object classifier based on the object level feature of the input image.

Preferably, in the object level category prediction sub-step S1023, performing object level category prediction for the scale-adjusted sample image can comprise: obtaining a masked feature map based on the feature and the updated object extraction component; and summing all values on each channel of the masked feature map, and performing object level category prediction based on a value obtained through the summing.

As an example, in each round of training performed with respect to each sample image, point multiplication is performed for the CNN feature map of the input image and the updated object extraction component in each round of training to obtain a masked feature map; and with respect to each channel of the CNN feature map, each channel is represented by summing all values on the H×W plane, so as to obtain a C-dimensional feature vector, and the vector obtained through the summing is inputted into the object classifier to perform object level category prediction.

In each round of training performed with respect to each sample image, in the training sub-step S1024, the image model may be trained based on a category prediction result of the scale-adjusted sample image.

As an example, the image model may be trained based on a category prediction result of the scale-adjusted sample image, and the training does not end until a predetermined convergence condition is satisfied. As an example, preferably, parameters of the image model may comprise parameters of the CNN, the predetermined number of local classifiers and the object classifier. Training the image model comprises training the parameters of the CNN, the predetermined number of local classifiers and the object classifier comprised in the image model. As an example, satisfying the predetermined convergence condition may comprise reaching predetermined N rounds of training, and satisfying the predetermined convergence condition may comprise that a loss function in the training is less than a predetermined loss, etc.

Preferably, in the training sub-step S1024, each round of category prediction result for the image with respect to each sample image may be a prediction result obtained by performing the object level category prediction, or be an average value of the local prediction result and the prediction result obtained by performing the object level category prediction.

As an example but not a limitation, both loss functions that are used for the local classifiers and the object classifier can be softmax loss function.

In a case where each round of category prediction result for the image with respect to each sample image is a prediction result obtained by performing the object level category prediction, an overall loss function of each round of training is a loss function of the object classifier. In a case where each round of category prediction result for the image with respect to each sample image is an average value of the local prediction result and the prediction result obtained by performing the object level category prediction, an overall loss function of each round of training is the sum of a loss function of the local classifiers and a loss function of the object classifier.

Moreover, the object extraction component can be used as category labels of local prediction performed by the local classifiers. As an example, a label map of local category prediction can be constructed using the object extraction component. As stated above, the local classifiers can perform category prediction with respect to feature points in a feature of an image. To be more specific, the local classifiers can perform category prediction with respect to each location (each point of H×W points on the plane formed by the length and the width of the CNN feature) on the CNN feature of the image. With respect to the above each location, a category label is determined by a value of a corresponding location on the object extraction component. Assuming that a non-zero-value in the binary object extraction component is represented by "1", value "1" in the object extraction component indicates that the above location belongs to a corresponding category, and value "0" in the object extraction component indicates that the above location belongs to a background category.

As can be seen from the above, in the method 100 for training an image model according to the embodiment of the present disclosure, an object extraction component may be updated in consideration of results of local level category prediction performed by local classifiers, such that the updated object extraction component is more accurate, thus being advantageous to improve the accuracy of classification by a generated image model.

As an example, with respect to each sample image in a training set, category prediction results obtained through each round of training are averaged, as a final category prediction result of the sample image.

Figure 6:
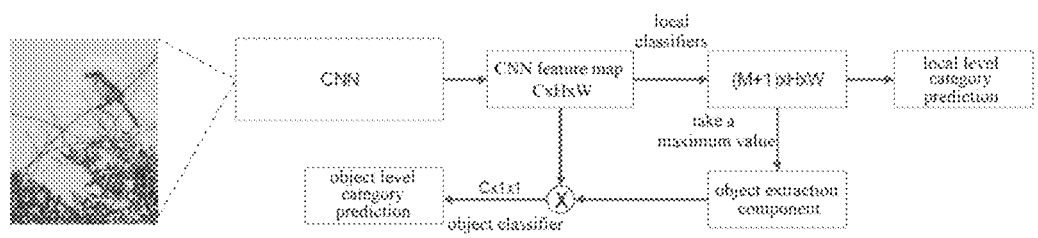
FIG. 6 is a diagram schematically showing processing performed in one round of training according to the embodiment of the present disclosure.

FIG. 6 is a diagram schematically showing processing performed in one round of training according to the embodiment of the present disclosure.

As shown in FIG. 6, firstly, a sample image at a certain scale is inputted as an input image into a CNN in the image model, so as to obtain a CNN feature map of a size of C×H×W of the input image. Then, the CNN feature map is inputted into a predetermined number of local classifiers, to obtain a local prediction result of a size of (M+1)×H×W through operations. By taking a maximum value with respect to the local prediction result, an object extraction component is obtained. Then for results obtained by performing point multiplication for the CNN feature map and the object extraction component, summing is performed with respect to each channel of the CNN feature, and C×1×1 (i.e., C-dimensional feature vector) obtained through the summing is inputted into the object classifier to perform object level category prediction. A category prediction result of this round of training may be a prediction result obtained by performing the object level category prediction, or be an average value of the local prediction result and the prediction result obtained by performing the object level category prediction. In this round, parameters of the CNN, the predetermined number of local classifiers and the object classifier comprised in the image model are trained.

In the step S104, an image model, for which training has been completed, can be obtained based on training results with respect to all sample images in the training set.

As an example, for all sample images in the training set, the processing in the step S102 are sequentially performed to obtain a training result with respect to each sampling image, and an image model, for which training has been completed, can be obtained after training has been performed with respect to all sample images in the training set.

To sum up, the method 100 for training an image model according to the embodiment of the present disclosure concerns an object inputted into an image of an image model at multiple scales. Under the supervision of object classification information, an object extraction component (as an example, the object extraction component may be an attention mask) is automatically learned (updated). In place of manual annotation using a bounding box of an object, in the method for training an image model of the present application, a bounding box of an object is generated according to a multi-scale object extraction component, and the object to be used for multi-scale object classification is cropped using the object extraction component. That is, the method 100 for training an image model according to the embodiment of the present disclosure can automatically learn an object extraction component, and automatically generate a bounding box of a concerned object based on the learned object extraction component, thereby an image model capable of quickly performing category prediction on images at different scales can be obtained. Moreover, in the method 100 for training an image model according to the embodiment of the present disclosure, an object extraction component may be updated in consideration of results of local level category prediction performed by local classifiers, such that the updated object extraction component is more accurate, thus being advantageous to improve the accuracy of classification by a generated image model.

Corresponding to the above method embodiment for training an image model, the present disclosure further provides the following embodiment of an apparatus for training an image model.

Figure 7:
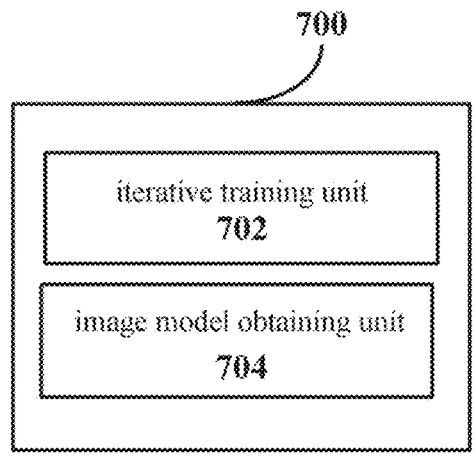
FIG. 7 is a block diagram showing a function configuration example of an apparatus for training an image model according to an embodiment of the present disclosure.

FIG. 7 is a block diagram showing a function configuration example of an apparatus 700 for training an image model according to the embodiment of the present disclosure.

As shown in FIG. 7, the apparatus 700 for training an image model according to the embodiment of the present disclosure may comprise an iterative training unit 702 and an image model obtaining unit 704. Next, function configuration examples of the iterative training unit 702 and the image model obtaining unit 704 will be described.

In the iterative training unit 702, N rounds of iterative training may be performed for the image model with respect to each sample image in a training set, where N is an integer greater than or equal to 2.

As an example, for a given training set, two or more rounds of iterative training may be performed for the image model with respect to each sample image in the training set.

Figure 8:
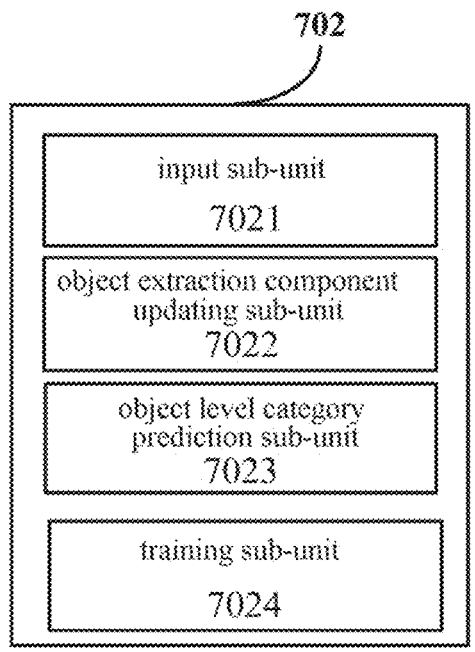
FIG. 8 is block diagram showing sub-units comprised in an iterative training unit of the apparatus for training an image model according to the embodiment of the present disclosure.

FIG. 8 is block diagram showing sub-units comprised in the iterative training unit 702 of the apparatus 700 for training an image model according to the embodiment of the present disclosure. As shown in FIG. 8, in the iterative training unit 702, in each round of training performed with respect to each sample image, processing in an input sub-unit 7021, an object extraction component updating sub-unit 7022, an object level category prediction sub-unit 7023 and a training sub-unit 7024 are performed, respectively.

In each round of training performed with respect to each sample image, in the input sub-unit 7021, an image obtained by cropping the sample image by an object extraction component obtained through a previous round of training may be inputted, as a scale-adjusted sample image, into the image model, wherein the object extraction component can be used for extracting concerned objects in sample images at respective scales, and a sample image at an initial scale is the sample image which is original.

As an example, in each round of training performed with respect to each sample image, a scale of the sample image may be adjusted according to a result of a previous round of training, and the scale-adjusted sample image may be used as an input image of the image model to perform this round of training on the image model. To be more specific, in each round of training, the sample image may be cropped by an object extraction component obtained through a previous round of training, and an image obtained through the cropping may be inputted, as a scale-adjusted sample image, into the image model to train the image model. As an example, in each round of training, an image obtained by cropping the sample image by an object extraction component obtained through a previous round of training may be used as an input image of the image model directly, and an image obtained through the cropping may be used as an input image of the image model after a scale of the image obtained through the cropping is adjusted (i.e., the image obtained through the cropping is zoomed), as well.

The object extraction component may be a binary image including a zero-value area and a non-zero-value area, wherein the zero-value area indicates a background area, and the non-zero-value area indicates a concerned area (i.e., foreground area). As an example but not a limitation, the object extraction component can be an attention mask, which can be used for extracting concerned objects (i.e., foreground objects) in sample images at respective scales. The object extraction component can also be a component other than the attention mask, as long as the object extraction component can extract the concerned objects in the sample images at the respective scales.

For specific examples of the scale-adjusted sample image and the object extraction component, reference may be made to the description in the corresponding portions in the above method embodiment, and no repeated description will be made herein.

Preferably, in each round of training performed with respect to each sample image, in the input sub-unit 7021, cropping the sample image by the object extraction component may comprise: enlarging the object extraction component to the scale of the initial sample image; calculating a bounding box of a non-zero area in the enlarged object extraction component; and cropping the sample image using the bounding box, and using the cropped image as the scale-adjusted sample image.

As an example, as stated above, in a first round of training, an input image inputted into the image model is the initial sample image, and in this round of training, a first image at a first scale is obtained through operations. In each subsequent round of training, an object extraction component obtained through a previous round of training is enlarged to the scale of the initial sample image; then, a bounding box of a non-zero area (i.e., white area) in the enlarged object extraction component may be calculated using the prior art, the sample image is cropped using the bounding box, and the cropped image is used as the scale-adjusted sample image.

For specific example of cropping the sample image by the object extraction component, reference may be made to the description in the corresponding portion in the above method embodiment, and no repeated description will be made herein.

As can be seen from the above, the apparatus 700 for training an image model can automatically learn an object extraction component, and automatically generate a bounding box of a concerned object based on the learned object extraction component, thereby an image model capable of quickly performing category prediction on images at different scales can be generated.

In each round of training performed with respect to each sample image, in the object extraction component updating sub-unit 7022, a feature of the scale-adjusted sample image may be inputted into a predetermined number of local classifiers in the image model respectively, category prediction may be performed with respect to feature points in the feature, so as to obtain a local prediction result, and the object extraction component may be updated based on the local prediction result.

As an example, the image model can have a predetermined number of local classifiers. The local classifiers can perform category prediction with respect to feature points in a feature of an image, so as to obtain a local prediction result. By taking a case in which three rounds of iterative training are performed on the image model as an example and assuming that the number of the local classifiers is n (n is an integer greater than or equal to 1), in a first round of training, a feature of a first image at a first scale is inputted into the n local classifiers, respectively, to obtain a first local prediction result, and an object extraction component at the first scale can be obtained through calculation based on the first local prediction result; in a second round of training, a feature of a second image at a second scale is inputted into the above n local classifiers, respectively, to obtain a second local prediction result, and the object extraction component at the first scale may be updated through calculation based on the second local prediction result, so as to obtain an object extraction component at the second scale; and in a third round of training, a feature of a third image at a third scale is inputted into the above n local classifiers, respectively, to obtain a third local prediction result, and the object extraction component at the second scale may be updated through calculation based on the third local prediction result, so as to obtain an object extraction component at the third scale.

In each round of training, a feature of an input image of the image model may be extracted using the prior art. As an example but not a limitation, a feature of an input image of the image model may be extracted using a Convolutional Neural network (CNN).

Preferably, in each round of training, in the object extraction component updating sub-unit 7022, a feature of the scale-adjusted sample image may be obtained using a CNN in the image model.

As described in the corresponding portion in the above method embodiment, in each round of training, a high level feature map, i.e., a CNN feature (or called CNN feature map), of an input image of the image model is obtained by the CNN in the image model. It is assumed that a size of the CNN feature is C×H×W, where C is the number of channels of the feature map (that is, C is a longitudinal length of the feature map), and H and W are a length and a width of the plane of the feature map, respectively.

Preferably, in each round of training performed with respect to each sample image, in the object extraction component updating sub-unit 7022, the local prediction result may be obtained by: performing category prediction using each local classifier, respectively, based on feature vectors at different locations which are extracted along a channel direction of the feature, to calculate a prediction result of each local classifier; and taking a maximum value with respect to the prediction results of the predetermined number of local classifiers, respectively, as the local prediction result.

For description of obtaining the local prediction result, reference may be made to the description in the corresponding portion in the above method embodiment, and no repeated description will be made herein.

Preferably, in each round of training performed with respect to each sample image, in the object extraction component updating sub-unit 7022, updating the object extraction component based on the local prediction result may comprise: taking a maximum value with respect to the local prediction result at each location, in a direction of a predicted category of the local prediction result, to obtain a two-dimensional prediction result; and using, as the updated object extraction component, a result obtained after performing binary processing on the two-dimensional prediction result.

For description of updating the object extraction component based on the local prediction result, reference may be made to the description in the corresponding portion in the above method embodiment, and no repeated description will be made herein.

In each round of training performed with respect to each sample image, in the object level category prediction sub-unit 7023, object level category prediction may be performed for the scale-adjusted sample image, based on the feature and the updated object extraction component.

As an example, the image model can comprise an object classifier which performs prediction based on an object level feature in an image. In each round of training performed with respect to each sample image, an object level feature of the input image may be extracted based on the CNN feature map of the input image (i.e., the above scale-adjusted sample image) of the image model and the updated object extraction component, so as to perform object level category prediction by the object classifier based on the object level feature of the input image.

Preferably, in the object level category prediction sub-unit 7023, performing object level category prediction for the scale-adjusted sample image may comprise: obtaining a masked feature map based on the feature and the updated object extraction component; and summing all values on each channel of the masked feature map, and performing object level category prediction based on a value obtained through the summing.

As an example, in each round of training performed with respect to each sample image, point multiplication is performed for the CNN feature map of the input image and the updated object extraction component in each round of training to obtain a masked feature map; and with respect to each channel of the CNN feature map, each channel is represented by summing all values on the H×W plane, so as to obtain a C-dimensional feature vector, and the vector obtained through the summing is inputted into the object classifier to perform object level category prediction.

In each round of training performed with respect to each sample image, in the training sub-unit 7024, the image model may be trained based on a category prediction result of the scale-adjusted sample image.

As an example, the image model may be trained based on a category prediction result of the scale-adjusted sample image, and the training does not end until a predetermined convergence condition is satisfied. As an example, preferably, parameters of the image model may comprise parameters of the CNN, the predetermined number of local classifiers and the object classifier. Training the image model comprises training the parameters of the CNN, the predetermined number of local classifiers and the object classifier comprised in the image model. As an example, satisfying the predetermined convergence condition may comprise reaching predetermined N rounds of training, and satisfying the predetermined convergence condition may comprise that a loss function in the training is less than a predetermined loss, etc.

Preferably, in the training sub-unit 7024, each round of category prediction result for the image with respect to each sample image may be a prediction result obtained by performing the object level category prediction, or be an average value of the local prediction result and the prediction result obtained by performing the object level category prediction.

As an example but not a limitation, both loss functions that are used for the local classifiers and the object classifier can be softmax loss function.

In a case where each round of category prediction result for the image with respect to each sample image is a prediction result obtained by performing the object level category prediction, an overall loss function of each round of training is a loss function of the object classifier. In a case where each round of category prediction result for the image with respect to each sample image is an average value of the local prediction result and the prediction result obtained by performing the object level category prediction, an overall loss function of each round of training is the sum of a loss function of the local classifiers and a loss function of the object classifier.

As can be seen from the above, in the apparatus 700 for training an image model according to the embodiment of the present disclosure, an object extraction component may be updated in consideration of results of local level category prediction performed by local classifiers, such that the updated object extraction component is more accurate, thus being advantageous to improve the accuracy of classification by a generated image model.

As an example, with respect to each sample image in a training set, category prediction results obtained through each round of training may be averaged, as a final category prediction result of the sample image.

In the image model obtaining unit 704, an image model, for which training has been completed, may be obtained based on training results with respect to all sample images in the training set.

As an example, for all sample images in the training set, the processing in the iterative training unit 702 are sequentially performed to obtain a training result with respect to each sampling image, and an image model for which training has been completed can be obtained after training has been performed with respect to all sample images in the training set.

To sum up, the apparatus 700 for training an image model according to the embodiment of the present disclosure can automatically learn an object extraction component, and automatically generate a bounding box of a concerned object based on the learned object extraction component, thereby an image model capable of quickly performing category prediction on images at different scales can be obtained. Moreover, in the apparatus 700 for training an image model according to the embodiment of the present disclosure, an object extraction component may be updated in consideration of results of local level category prediction performed by local classifiers, such that the updated object extraction component is more accurate, thus being advantageous to improve the accuracy of classification by a generated image model.

It should be noted that, although the function configuration of the apparatus for training an image model according to the embodiment of the present disclosure has been described above, this is only exemplary but not limiting, and those skilled in the art can carry out modifications on the above embodiment according to the principle of the disclosure, for example can perform additions, deletions or combinations or the like on the respective functional modules in the embodiment. Moreover, all such modifications fall within the scope of the present disclosure.

In addition, it should also be noted that the apparatus embodiment herein corresponds to the above method embodiment. Thus, for contents not described in detail in the apparatus embodiment, reference may be made to the description in the corresponding portions in the method embodiment, and no repeated description will be made herein.

It should be understood that, machine executable instructions in the storage medium and the program product according to embodiments of the present disclosure can be further configured to implement the above method for training an image model. Thus for contents not described in detail herein, reference may be made to the description in the preceding corresponding portions, and no repeated description will be made herein.

Accordingly, a storage medium for carrying the above program product comprising machine executable instructions is also included in the disclosure of the present invention. The storage medium includes but is not limited to a floppy disc, an optical disc, a magnetic optical disc, a memory card, a memory stick and the like.

According to another aspect of the present disclosure, there is provided a method 900 for category prediction which is capable of quickly and accurately classifying images at different scales.

The method 900 for category prediction performs category prediction for an image to be classified, using an image model obtained through training by the above method 100 for training an image model. In the method 900 for category prediction, with respect to the image to be classified, N rounds of category prediction are performed using the trained image model, wherein in each round of category prediction, a scale of the image to be classified is adjusted according to a result of a previous round of category prediction, and the scale-adjusted image to be classified is used as an input image of the trained image model to perform this round of category prediction, where N is an integer greater than or equal to 2.

Figure 9:
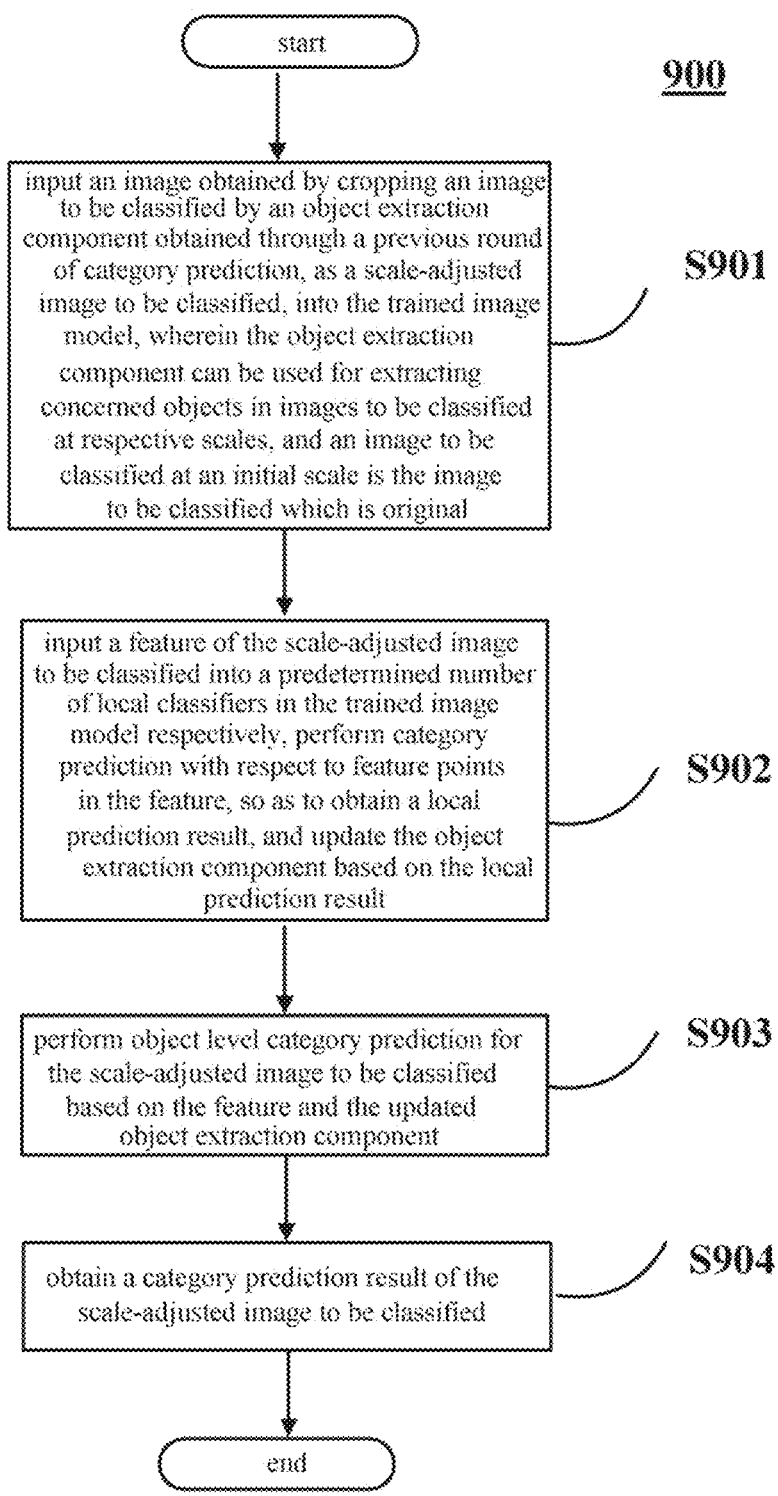
FIG. 9 is a flowchart showing an example of a flow of a method for category prediction according to an embodiment of the present disclosure.

An example of a flow of the method 900 for category prediction according to an embodiment of the present disclosure will be described with reference to FIG. 9. FIG. 9 is a flowchart showing an example of a flow of the method 900 for category prediction according to the embodiment of the present disclosure. As shown in FIG. 9, the method 900 for category prediction according to the embodiment of the present disclosure, in each round of category prediction performed with respect to each image to be classified, performs processing in an input sub-step S901, an object extraction component updating sub-step S902, an object level category prediction sub-step S903 and a this-round-of-prediction-result obtaining sub-step S904, respectively.

In each round of category prediction performed with respect to each image to be classified, in the input sub-step S901, an image obtained by cropping the image to be classified by an object extraction component obtained through a previous round of category prediction may be inputted, as a scale-adjusted image to be classified, into the trained image model, wherein the object extraction component can be used for extracting concerned objects in images to be classified at respective scales, and an image to be classified at an initial scale is the image to be classified which is original.

As an example, in each round of category prediction performed with respect to each image to be classified, a scale of the image to be classified may be adjusted according to a result of a previous round of category prediction, and the scale-adjusted image to be classified may be used as an input image of the trained image model to perform this round of category prediction. To be more specific, in each round of category prediction, the image to be classified may be cropped by an object extraction component obtained through a previous round of category prediction, and an image obtained through the cropping may be inputted, as a scale-adjusted image to be classified, into the trained image model to perform category prediction for the input image. As an example, in each round of category prediction, an image obtained by cropping the image to be classified by an object extraction component obtained through a previous round of category prediction may be used as an input image of the trained image model directly, and an image obtained through the cropping may be used as an input image of the trained image model after a scale of the image obtained through the cropping is adjusted (i.e., the image obtained through the cropping is zoomed), as well.

The object extraction component may be a binary image including a zero-value area and a non-zero-value area, wherein the zero-value area indicates a background area, and the non-zero-value area indicates a concerned area (i.e., foreground area). As an example but not a limitation, the object extraction component can be an attention mask, which can be used for extracting concerned objects (i.e., foreground objects) in images to be classified at respective scales. The object extraction component can also be a component other than the attention mask, as long as the object extraction component can extract the concerned objects in the images to be classified at the respective scales.

As an example, it is assumed that N is 3, i.e., three rounds of iterative category prediction are performed on the image to be classified. In a first round of category prediction, an original image to be classified is inputted into the trained image model, and a first object extraction component at a first scale is obtained through operations in the category prediction process. Then, in a second round of category prediction, the original image to be classified may be cropped by the first object extraction component obtained through the first round of category prediction, and an image including a concerned object at the first scale which is obtained through the cropping may be inputted into the trained image model, and the object extraction component at the first scale is updated through operations in the category prediction process, to obtain a second object extraction component at a second scale. Finally, in a third round of category prediction, the original image to be classified may be cropped by the second object extraction component obtained through the second round of category prediction, and an image including the concerned object at the second scale which is obtained through the cropping may be inputted into the trained image model.

Preferably, in each round of category prediction performed with respect to each image to be classified, in the input sub-step S901, cropping the image to be classified by the object extraction component may comprise: enlarging the object extraction component to the scale of the initial image to be classified; calculating a bounding box of a non-zero area in the enlarged object extraction component; and cropping the image to be classified using the bounding box, and using the cropped image as the scale-adjusted image to be classified.

As an example, as stated above, in a first round of category prediction, an input image inputted into the trained image model is the initial image to be classified, and in this round of category prediction, a first image at a first scale is obtained through operations. In each subsequent round of category prediction, an object extraction component obtained through a previous round of category prediction is enlarged to the scale of the initial image to be classified; then, a bounding box of a non-zero area (i.e., white area) in the enlarged object extraction component may be calculated using the prior art, the image to be classified is cropped using the bounding box, and the cropped image is used as the scale-adjusted image to be classified.

As can be seen from the above, the method 900 for category prediction can automatically learn an object extraction component, and automatically generate a bounding box of a concerned object based on the learned object extraction component, thereby allowing category prediction on images at different scales to be performed quickly.

In each round of category prediction performed with respect to each image to be classified, in the object extraction component updating sub-step S902, a feature of the scale-adjusted image to be classified may be inputted into a predetermined number of local classifiers in the trained image model respectively, category prediction may be performed with respect to feature points in the feature, so as to obtain a local prediction result, and the object extraction component may be updated based on the local prediction result.

As an example, the trained image model can have a predetermined number of local classifiers. The local classifiers can perform category prediction with respect to feature points in a feature of an image, so as to obtain a local prediction result. By taking the case in which three rounds of iterative category prediction are performed on the image to be classified as stated above as an example and assuming that the number of the local classifiers is n (n is an integer greater than or equal to 1), in a first round of category prediction, a feature of a first image (original image to be classified) at a first scale is inputted into the n local classifiers, respectively, to obtain a first local prediction result, and an object extraction component at the first scale can be obtained through calculation based on the first local prediction result; in a second round of category prediction, a feature of a second image at a second scale is inputted into the above n local classifiers, respectively, to obtain a second local prediction result, and the object extraction component at the first scale may be updated through calculation based on the second local prediction result, so as to obtain an object extraction component at the second scale; and in a third round of category prediction, a feature of a third image at a third scale is inputted into the above n local classifiers, respectively, to obtain a third local prediction result, and the object extraction component at the second scale may be updated through calculation based on the third local prediction result, so as to obtain a third object extraction component at the third scale.

In each round of category prediction, a feature of an image to be classified may be extracted, using the prior art, according to a configuration of the trained image model as used. As an example but not a limitation, a feature of an image to be classified may be extracted using a Convolutional Neural network (CNN).

Preferably, in each round of category prediction, in the object extraction component updating sub-step S902, a feature of the scale-adjusted image to be classified may be obtained using a CNN.

As an example, the trained image model comprises a feed-forward CNN. Therefore, in each round of category prediction, a high level feature map, i.e., a CNN feature (or called CNN feature map), of an input image of the trained image model is obtained by the CNN in the trained image model. It is assumed that a size of the CNN feature is C×H×W, where C is the number of channels of the feature map (that is, C is a longitudinal length of the feature map), and H and W are a length and a width of the plane of the feature map, respectively. In the description below, description will be made by taking a case in which a feature of an input image of the trained image model is extracted using the CNN as an example.

Preferably, in each round of category prediction performed with respect to each image to be classified, in the object extraction component updating sub-step S902, the local prediction result may be obtained by: performing category prediction, using each local classifier, respectively, based on feature vectors at different locations which are extracted along a channel direction of the feature, to calculate a prediction result of each local classifier; and taking a maximum value with respect to the prediction results of the predetermined number of local classifiers, respectively, as the local prediction result.

For specific description of obtaining the local prediction result, reference may be made to the description in the corresponding portion in the above embodiment of the method 100 for training an image model, and no repeated description will be made herein.

Preferably, in each round of category prediction performed with respect to each image to be classified, in the object extraction component updating sub-step S902, updating the object extraction component based on the local prediction result may comprise: taking a maximum value with respect to the local prediction result at each location, in a direction of a predicted category of the local prediction result, to obtain a two-dimensional prediction result; and using, as the updated object extraction component, a result obtained after performing binary processing on the two-dimensional prediction result.

For specific description of updating the object extraction component based on the local prediction result, reference may be made to the description in the corresponding portion in the above embodiment of the method 100 for training an image model, and no repeated description will be made herein.

In each round of category prediction performed with respect to each image to be classified, in the object level category prediction sub-step S903, object level category prediction may be performed for the scale-adjusted image to be classified, based on the feature and the updated object extraction component.

As an example, the trained image model may comprise an object classifier which performs prediction based on an object level feature in an image. In each round of category prediction performed with respect to each image to be classified, an object level feature of the input image may be extracted based on the CNN feature map of the input image (i.e., the above scale-adjusted image to be classified) of the trained image model and the updated object extraction component, so as to perform object level category prediction by the object classifier based on the object level feature of the input image.

Preferably, in the object level category prediction sub-step S903, performing object level category prediction for the scale-adjusted image to be classified may comprise: obtaining a masked feature map based on the feature and the updated object extraction component; and summing all values on each channel of the masked feature map, and performing object level category prediction based on a value obtained through the summing.

For specific description of performing object level category prediction for the scale-adjusted image to be classified, reference may be made to the description in the corresponding portion in the above embodiment of the method 100 for training an image model, and no repeated description will be made herein.

In each round of category prediction performed with respect to each image to be classified, in the this-round-of-prediction-result obtaining sub-step S904, a category prediction result of the scale-adjusted image to be classified is obtained.

Preferably, in the this-round-of-prediction-result obtaining sub-step S904, each round of category prediction result for the image with respect to each image to be classified may be a prediction result obtained by performing the object level category prediction, or be an average value of the local prediction result and the prediction result obtained by performing the object level category prediction.

As can be seen from the above, in the method 900 for category prediction according to the embodiment of the present disclosure, an object extraction component may be updated in consideration of results of local level category prediction performed by local classifiers, such that the updated object extraction component is more accurate, thus being advantageous to improve the accuracy of classification.

As an example, with respect to each image to be classified, category prediction results obtained through each round of category prediction may be averaged, as a final category prediction result of the image to be classified.

To sum up, the method 900 for category prediction according to the embodiment of the present disclosure can automatically learn an object extraction component, and automatically generate a bounding box of a concerned object based on the learned object extraction component, thereby category prediction on images at different scales can be performed quickly. Moreover, in the method 900 for category prediction according to the embodiment of the present disclosure, an object extraction component may be updated in consideration of results of local level category prediction performed by local classifiers, such that the updated object extraction component is more accurate, thus being advantageous to improve the accuracy of classification.

Corresponding to the above method embodiment for category prediction, the present disclosure further provides the following embodiment of an apparatus 1000 for category prediction.

The apparatus 1000 for category prediction performs category prediction for an image to be classified, using an image model obtained through training by the above method 100 for training an image model. In the apparatus 1000 for category prediction, with respect to the image to be classified, N rounds of category prediction are performed using the trained image model, wherein in each round of category prediction, a scale of the image to be classified is adjusted according to a result of a previous round of category prediction, and the scale-adjusted image to be classified is used as an input image of the trained image model to perform this round of category prediction, where N is an integer greater than or equal to 2.

Figure 10:
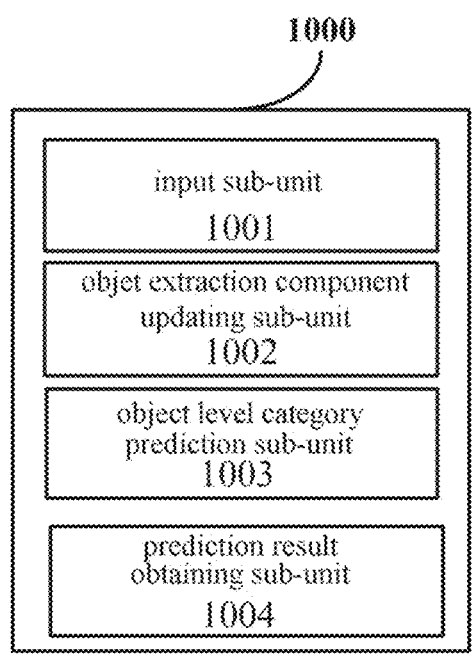
FIG. 10 is a block diagram showing a function configuration example of an apparatus for category prediction according to an embodiment of the present disclosure.

FIG. 10 is a block diagram showing a function configuration example of the apparatus 1000 for category prediction according to an embodiment of the present disclosure.

As shown in FIG. 10, the apparatus 1000 for category prediction according to the embodiment of the present disclosure, in each round of category prediction performed with respect to each image to be classified, performs processing in an input sub-unit 1001, an object extraction component updating sub-unit 1002, an object level category prediction sub-unit 1003 and a prediction result obtaining sub-unit 1004, respectively. Next, function configuration examples of the input sub-unit 1001, the object extraction component updating sub-unit 1002, the object level category prediction sub-unit 1003 and the prediction result obtaining sub-unit 1004 will be described.

In each round of category prediction performed with respect to each image to be classified, in the input sub-unit 1001, an image obtained by cropping the image to be classified by an object extraction component obtained through a previous round of category prediction may be inputted, as a scale-adjusted image to be classified, into the trained image model, wherein the object extraction component can be used for extracting concerned objects in images to be classified at respective scales, and an image to be classified at an initial scale is the image to be classified which is original.

For description of the scale-adjusted sample image and the object extraction component, reference may be made to the description in the corresponding portions in the above embodiment of the method 100 for training an image model, and no repeated description will be made herein.

Preferably, in each round of category prediction performed with respect to each image to be classified, in the input sub-unit 1001, cropping the image to be classified by the object extraction component may comprise: enlarging the object extraction component to the scale of the initial image to be classified; calculating a bounding box of a non-zero area in the enlarged object extraction component; and cropping the image to be classified using the bounding box, and using the cropped image as the scale-adjusted image to be classified.

For description of cropping the image to be classified by the object extraction component, reference may be made to the description in the corresponding portion in the above embodiment of the method 100 for training an image model, and no repeated description will be made herein.

As can be seen from the above, the apparatus 1000 for category prediction can automatically learn an object extraction component, and automatically generate a bounding box of a concerned object based on the learned object extraction component, thereby allowing category prediction on images at different scales to be performed quickly.

In each round of category prediction performed with respect to each image to be classified, in the object extraction component updating sub-unit 1002, a feature of the scale-adjusted image to be classified may be inputted into a predetermined number of local classifiers in the trained image model respectively, category prediction may be performed with respect to feature points in the feature, so as to obtain a local prediction result, and the object extraction component may be updated based on the local prediction result.

For description of updating the object extraction component based on the local prediction result, reference may be made to the description in the corresponding portion in the above embodiment of the method 100 for training an image model, and no repeated description will be made herein.

In each round of category prediction, a feature of an image to be classified may be extracted, using the prior art, according to a configuration of the trained image model as used. As an example but not a limitation, a feature of an image to be classified may be extracted using a Convolutional Neural network (CNN).

Preferably, in each round of category prediction, in the object extraction component updating sub-unit 1002, a feature of the scale-adjusted image to be classified may be obtained using a CNN.

Preferably, in each round of category prediction performed with respect to each image to be classified, in the object extraction component updating sub-unit 1002, the local prediction result may be obtained by: performing category prediction using each local classifier, respectively, based on feature vectors at different locations which are extracted along a channel direction of the feature, to calculate a prediction result of each local classifier; and taking a maximum value with respect to the prediction results of the predetermined number of local classifiers, respectively, as the local prediction result.

For specific description of obtaining the local prediction result, reference may be made to the description in the corresponding portion in the above embodiment of the method 100 for training an image model, and no repeated description will be made herein.

Preferably, in each round of category prediction performed with respect to each image to be classified, in the object extraction component updating sub-unit 1002, updating the object extraction component based on the local prediction result may comprise: taking a maximum value with respect to the local prediction result at each location, in a direction of a predicted category of the local prediction result, to obtain a two-dimensional prediction result; and using, as the updated object extraction component, a result obtained after performing binary processing on the two-dimensional prediction result.

For specific description of updating the object extraction component based on the local prediction result, reference may be made to the description in the corresponding portion in the above embodiment of the method 100 for training an image model, and no repeated description will be made herein.

In each round of category prediction performed with respect to each image to be classified, in the object level category prediction sub-unit 1003, object level category prediction for the scale-adjusted image to be classified may be performed based on the feature and the updated object extraction component.

As an example, the trained image model may comprise an object classifier which performs prediction based on an object level feature in an image. In each round of category prediction performed with respect to each image to be classified, an object level feature of the input image may be extracted based on the CNN feature map of the input image (i.e., the above scale-adjusted image to be classified) of the trained image model and the updated object extraction component, so as to perform object level category prediction by the object classifier based on the object level feature of the input image.

Preferably, in the object level category prediction sub-unit 1003, performing object level category prediction for the scale-adjusted image to be classified may comprise: obtaining a masked feature map based on the feature and the updated object extraction component; and summing all values on each channel of the masked feature map, and performing object level category prediction based on a value obtained through the summing.

For specific description of performing object level category prediction for the scale-adjusted image to be classified, reference may be made to the description in the corresponding portion in the above embodiment of the method 100 for training an image model, and no repeated description will be made herein.

In each round of category prediction performed with respect to each image to be classified, in the prediction result obtaining sub-unit 1004, a category prediction result of the scale-adjusted image to be classified is obtained.

Preferably, in the prediction result obtaining sub-unit 1004, each round of category prediction result for the image with respect to each image to be classified may be a prediction result obtained by performing the object level category prediction, or be an average value of the local prediction result and the prediction result obtained by performing the object level category prediction.

As can be seen from the above, in the apparatus 1000 for category prediction according to the embodiment of the present disclosure, an object extraction component may be updated in consideration of results of local level category prediction performed by local classifiers, such that the updated object extraction component is more accurate, thus being advantageous to improve the accuracy of classification.

As an example, with respect to each image to be classified, category prediction results obtained through each round of category prediction may be averaged, as a final category prediction result of the image to be classified.

To sum up, the apparatus 1000 for category prediction according to the embodiment of the present disclosure can automatically learn an object extraction component, and automatically generate a bounding box of a concerned object based on the learned object extraction component, thereby allowing category prediction on images at different scales to be performed quickly. Moreover, in the apparatus 1000 for category prediction according to the embodiment of the present disclosure, an object extraction component may be updated in consideration of results of local level category prediction performed by local classifiers, such that the updated object extraction component is more accurate, thus being advantageous to improve the accuracy of classification.

It should be noted that, although the function configuration of the apparatus for category prediction according to the embodiment of the present disclosure has been described above, this is only exemplary but not limiting, and those skilled in the art can carry out modifications on the above embodiment according to the principle of the disclosure, for example can perform additions, deletions or combinations or the like on the respective functional modules in the embodiment. Moreover, all such modifications fall within the scope of the present disclosure.

In addition, it should also be noted that the apparatus embodiment herein corresponds to the above method embodiment. Therefore, for contents not described in detail in the apparatus embodiment, reference may be made to the description in the corresponding portions in the method embodiment, and no repeated description will be made herein.

It should be understood that, machine executable instructions in the storage medium and the program product according to embodiments of the present disclosure can be further configured to implement the above method for category prediction. Therefore, for contents not described in detail herein, reference may be made to the description in the preceding corresponding portions, and no repeated description will be made herein.

Accordingly, a storage medium for carrying the above program product comprising machine executable instructions is also included in the disclosure of the present invention. The storage medium includes but is not limited to a floppy disc, an optical disc, a magnetic optical disc, a memory card, a memory stick and the like.

Figure 11:
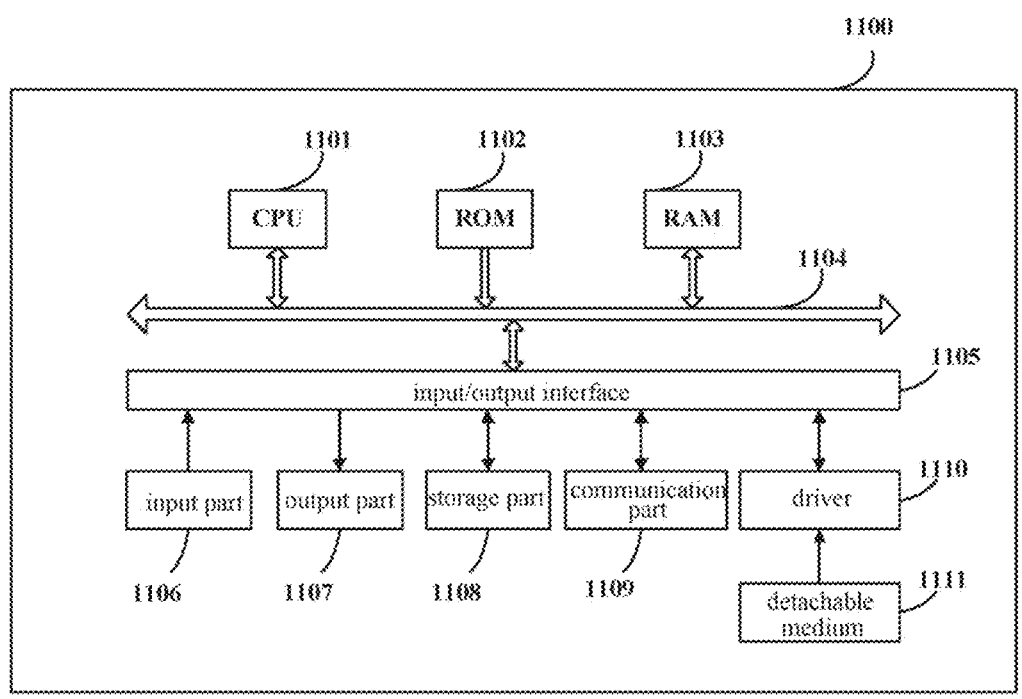
FIG. 11 is a block diagram showing an exemplary structure which is used as a personal computer usable in an embodiment of the present disclosure.

In addition, it should also be noted that, the foregoing series of processing and apparatuses can also be implemented by software and/or firmware. In the case of implementation by software and/or firmware, programs constituting the software are installed from a storage medium or a network to a computer having a dedicated hardware structure, for example the universal personal computer 1100 as shown in FIG. 11. The computer, when installed with various programs, can execute various functions and the like.

In FIG. 11, a Central Processing Unit (CPU) 1101 executes various processing according to programs stored in a Read-Only Memory (ROM) 1102 or programs loaded from a storage part 1108 to a Random Access Memory (RAM) 1103. In the RAM 1103, data needed when the CPU 1101 executes various processing and the like is also stored, as needed.

The CPU 1101, the ROM 1102 and the RAM 1103 are connected to each other via a bus 1104. An input/output interface 1105 is also connected to the bus 1104.

The following components are connected to the input/output interface 1105: an input part 1106, including a keyboard, a mouse and the like; an output part 1107, including a display, such as a Cathode Ray Tube (CRT), a Liquid Crystal Display (LCD) and the like, as well as a speaker and the like; the storage part 1108, including a hard disc and the like; and a communication part 1109, including a network interface card such as an LAN card, a modem and the like. The communication part 1109 executes communication processing via a network such as the Internet.

As needed, a driver 1110 is also connected to the input/output interface 1105. A detachable medium 1111 such as a magnetic disc, an optical disc, a magnetic optical disc, a semiconductor memory and the like is installed on the driver 1110 as needed, such that computer programs read therefrom are installed in the storage part 1108 as needed.

In a case where the foregoing series of processing is implemented by software, programs constituting the software are installed from a network such as the Internet or a storage medium such as the detachable medium 1111.

Those skilled in the art should appreciate that, such a storage medium is not limited to the detachable medium 1111 in which programs are stored and which are distributed separately from an apparatus to provide the programs to users as shown in FIG. 11. Examples of the detachable medium 1111 include a magnetic disc (including a floppy disc (registered trademark)), a compact disc (including a Compact Disc Read-Only Memory (CD-ROM) and a Digital Versatile Disc (DVD), a magneto optical disc (including a Mini Disc (MD) (registered trademark)), and a semiconductor memory. Or, the memory medium may be hard discs included in the ROM 1102 and the memory part 1108 and the like, in which programs are stored and which are distributed together with the apparatus containing them to users.

Preferred embodiments of the present disclosure have been described above with reference to the drawings. However, the present disclosure of course is not limited to the above examples. Those skilled in the art can obtain various alterations and modifications within the scope of the appended claims, and it should be understood that these alterations and modifications naturally will fall within the technical scope of the present disclosure.

For example, in the above embodiments, a plurality of functions incorporated in one unit can be implemented by separate devices. Alternatively, in the above embodiments, a plurality of functions implemented by a plurality of units can be implemented by separate devices, respectively. In addition, one of the above functions can be implemented by a plurality of units. Undoubtedly, such configuration is included within the technical scope of the present disclosure.

In the specification, the steps described in the flowcharts not only include processing executed in the order according to a time sequence, but also include processing executed in parallel or separately but not necessarily according to a time sequence. Moreover, even in the steps of the processing according to a time sequence, it is of course still possible to appropriately change the order.

In addition, the technology according to the present disclosure can also be configured as follows.

Appendix 1. A method for training an image model, comprising:

performing N rounds of iterative training for the image model with respect to each sample image in a training set, where N is an integer greater than or equal to 2, and performing the following processing in each round of training performed with respect to each sample image:

inputting an image obtained by cropping the sample image by an object extraction component obtained through a previous round of training, as a scale-adjusted sample image, into the image model, wherein the object extraction component is used for extracting concerned objects in sample images at respective scales, and a sample image at an initial scale is the sample image which is original;

inputting a feature of the scale-adjusted sample image into a predetermined number of local classifiers in the image model respectively, performing category prediction with respect to feature points in the feature, so as to obtain a local prediction result, and updating the object extraction component based on the local prediction result;

performing object level category prediction for the scale-adjusted sample image based on the feature and the updated object extraction component; and training the image model based on a category prediction result of the scale-adjusted sample image, and obtaining, based on training results with respect to all sample images in the training set, an image model for which training has been completed.

Appendix 2. The method for training an image model according to Appendix 1, wherein the local prediction result is obtained by:

performing category prediction using each local classifier, respectively, based on feature vectors at different locations which are extracted along a channel direction of the feature, to calculate a prediction result of each local classifier; and taking a maximum value with respect to the prediction results of the predetermined number of local classifiers, respectively, as the local prediction result.

Appendix 3. The method for training an image model according to Appendix 2, wherein updating the object extraction component based on the local prediction result comprises:

taking a maximum value with respect to the local prediction result at each location, in a direction of a predicted category of the local prediction result, to obtain a two-dimensional prediction result; and using, as the updated object extraction component, a result obtained after performing binary processing on the two-dimensional prediction result.

Appendix 4. The method for training an image model according to Appendix 1, wherein cropping the sample image by the object extraction component comprises:

enlarging the object extraction component to the scale of the initial sample image;

calculating a bounding box of a non-zero area in the enlarged object extraction component; and cropping the sample image using the bounding box, and using the cropped image as the scale-adjusted sample image.

Appendix 5. The method for training an image model according to Appendix 1, wherein performing object level category prediction for the scale-adjusted sample image comprises:

obtaining a masked feature map based on the feature and the updated object extraction component; and summing all values on each channel of the masked feature map, and performing object level category prediction based on a value obtained through the summing.

Appendix 6. The method for training an image model according to Appendix 1, wherein each round of category prediction result for the image with respect to each sample image is a prediction result obtained by performing the object level category prediction, or is an average value of the local prediction result and the prediction result obtained by performing the object level category prediction.

Appendix 7. The method for training an image model according to Appendix 1, wherein the feature of the scale-adjusted sample image is obtained using a convolutional neural network in the image model.

Appendix 8. An apparatus for training an image model, comprising:

an iterative training unit configured to perform N rounds of iterative training for the image model with respect to each sample image in a training set, where N is an integer greater than or equal to 2, and to perform processing in the following sub-units, respectively, in each round of training performed with respect to each sample image:

an input sub-unit configured to input an image obtained by cropping the sample image by an object extraction component obtained through a previous round of training, as a scale-adjusted sample image, into the image model, wherein the object extraction component is used for extracting concerned objects in sample images at respective scales, and a sample image at an initial scale is the sample image which is original;

an object extraction component updating sub-unit configured to input a feature of the scale-adjusted sample image into a predetermined number of local classifiers in the image model respectively, performing category prediction with respect to feature points in the feature, so as to obtain a local prediction result, and to update the object extraction component based on the local prediction result;

an object level category prediction sub-unit configured to perform object level category prediction for the scale-adjusted sample image based on the feature and the updated object extraction component; and a training sub-unit configured to train the image model based on a category prediction result of the scale-adjusted sample image, and an image model obtaining unit configured to obtain, based on training results with respect to all sample images in the training set, an image model for which training has been completed.

Appendix 9. The apparatus for training an image model according to Appendix 8, wherein in the object extraction component updating sub-unit, the local prediction result is obtained by:

performing category prediction using each local classifier, respectively, based on feature vectors at different locations which are extracted along a channel direction of the feature, to calculate a prediction result of each local classifier; and taking a maximum value with respect to the prediction results of the predetermined number of local classifiers, respectively, as the local prediction result.

Appendix 10. The apparatus for training an image model according to Appendix 9, wherein the object extraction component updating sub-unit is further configured to:

take a maximum value with respect to the local prediction result at each location, in a direction of a predicted category of the local prediction result, to obtain a two-dimensional prediction result; and use, as the updated object extraction component, a result obtained after performing binary processing on the two-dimensional prediction result.

Appendix 11. The apparatus for training an image model according to Appendix 8, wherein the input sub-unit is further configured to:

enlarge the object extraction component to the scale of the initial sample image;

calculate a bounding box of a non-zero area in the enlarged object extraction component; and crop the sample image using the bounding box, and use the cropped image as the scale-adjusted sample image.

Appendix 12. The apparatus for training an image model according to Appendix 8, wherein the object level category prediction sub-unit is further configured to:

obtain a masked feature map based on the feature and the updated object extraction component; and sum all values on each channel of the masked feature map, and performing object level category prediction based on a value obtained through the summing.

Appendix 13. The apparatus for training an image model according to Appendix 8, wherein in the training sub-unit, each round of category prediction result for the image with respect to each sample image is a prediction result obtained by performing the object level category prediction, or is an average value of the local prediction result and the prediction result obtained by performing the object level category prediction.

Appendix 14. The apparatus for training an image model according to Appendix 8, wherein in the input sub-unit, the feature of the scale-adjusted sample image is obtained using a convolutional neural network in the image model.

Appendix 15. A method for performing category prediction for an image to be classified using an image model obtained through training by the method according to any one of Appendixes 1 to 7, in which with respect to the image to be classified, N rounds of category prediction are performed using the trained image model, wherein in each round of category prediction, a scale of the image to be classified is adjusted according to a result of a previous round of category prediction, and the scale-adjusted image to be classified is used as an input image of the trained image model to perform this round of category prediction, where N is an integer greater than or equal to 2.

The invention claimed is:

1. A method for training an image model, comprising:

performing N rounds of iterative training for the image model with respect to each sample image in a training set, where N is an integer greater than or equal to 2, and performing the following processing in each round of training performed with respect to each sample image:

inputting an image obtained by cropping the sample image by an object extraction component obtained through a previous round of training, as a scale-adjusted sample image, into the image model, wherein the object extraction component is used for extracting concerned objects in sample images at respective scales, and a sample image at an initial scale is the sample image which is original;

inputting a feature of the scale-adjusted sample image into a predetermined number of local classifiers in the image model respectively, performing category prediction with respect to feature points in the feature, so as to obtain a local prediction result, and updating the object extraction component based on the local prediction result;

performing object level category prediction for the scale-adjusted sample image based on the feature and the updated object extraction component; and training the image model based on a category prediction result of the scale-adjusted sample image, and obtaining, based on training results with respect to all sample images in the training set, an image model for which training has been completed.

2. The method for training an image model according to claim 1, wherein the local prediction result is obtained by:

performing category prediction using each local classifier, respectively, based on feature vectors at different locations which are extracted along a channel direction of the feature, to calculate a prediction result of each local classifier; and taking a maximum value with respect to the prediction results of the predetermined number of local classifiers, respectively, as the local prediction result.

3. The method for training an image model according to claim 2, wherein updating the object extraction component based on the local prediction result comprises:

taking a maximum value with respect to the local prediction result at each location, in a direction of a predicted category of the local prediction result, to obtain a two-dimensional prediction result; and using, as the updated object extraction component, a result obtained after performing binary processing on the two-dimensional prediction result.

4. The method for training an image model according to claim 1, wherein cropping the sample image by the object extraction component comprises:

enlarging the object extraction component to the scale of the initial sample image;

calculating a bounding box of a non-zero area in the enlarged object extraction component; and cropping the sample image using the bounding box, and using the cropped image as the scale-adjusted sample image.

5. The method for training an image model according to claim 1, wherein performing object level category prediction for the scale-adjusted sample image comprises:

obtaining a masked feature map based on the feature and the updated object extraction component; and summing all values on each channel of the masked feature map, and performing object level category prediction based on a value obtained through the summing.

6. The method for training an image model according to claim 1, wherein each round of category prediction result for the image with respect to each sample image is a prediction result obtained by performing the object level category prediction, or is an average value of the local prediction result and the prediction result obtained by performing the object level category prediction.

7. The method for training an image model according to claim 1, wherein the feature of the scale-adjusted sample image is obtained using a convolutional neural network in the image model.

8. A method for performing category prediction for an image to be classified using an image model obtained through training by the method according to claim 1, in which with respect to the image to be classified, N rounds of category prediction are performed using the trained image model, wherein in each round of category prediction, a scale of the image to be classified is adjusted according to a result of a previous round of category prediction, and the scale-adjusted image to be classified is used as an input image of the trained image model to perform this round of category prediction, where N is an integer greater than or equal to 2.

9. An apparatus for training an image model, comprising:
an iterative training unit configured to perform N rounds of iterative training for the image model with respect to each sample image in a training set, where N is an integer greater than or equal to 2, and to perform processing in the following sub-units, respectively, in each round of training performed with respect to each sample image:
an input sub-unit configured to input an image obtained by cropping the sample image by an object extraction component obtained through a previous round of training, as a scale-adjusted sample image, into the image model, wherein the object extraction component is used for extracting concerned objects in sample images at respective scales, and a sample image at an initial scale is the sample image which is original;
an object extraction component updating sub-unit configured to input a feature of the scale-adjusted sample image into a predetermined number of local classifiers in the image model, respectively, performing category prediction with respect to feature points in the feature, so as to obtain a local prediction result, and to update the object extraction component based on the local prediction result;
an object level category prediction sub-unit configured to perform object level category prediction for the scale-adjusted sample image based on the feature and the updated object extraction component; and
a training sub-unit configured to train the image model based on a category prediction result of the scale-adjusted sample image, and
an image model obtaining unit configured to obtain, based on training results with respect to all sample images in the training set, an image model for which training has been completed.

10. The apparatus for training an image model according to claim 9, wherein in the object extraction component updating sub-unit, the local prediction result is obtained by:
performing category prediction using each local classifier, respectively, based on feature vectors at different locations which are extracted along a channel direction of the feature, to calculate a prediction result of each local classifier; and
taking a maximum value with respect to the prediction results of the predetermined number of local classifiers, respectively, as the local prediction result.

\* \* \* \* \*